United States Patent [19]
Lyle et al.

[11] Patent Number: 6,091,317
[45] Date of Patent: *Jul. 18, 2000

[54] TEMPERATURE SENSOR ASSEMBLY

[75] Inventors: William Richard Lyle, Doylestown, Pa.; Reginald M. Groom, Redford, Mich.

[73] Assignee: Ford Motor Company, Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/110,350

[22] Filed: Jul. 6, 1998

[51] Int. Cl.[7] ................................................ H01C 3/04
[52] U.S. Cl. .......................... 338/28; 338/25; 338/315; 338/229; 338/220
[58] Field of Search ................................ 338/25, 28, 273, 338/276, 313, 332, 329, 220, 221, 229, 315, 266; 361/723, 768, 773

[56] References Cited

U.S. PATENT DOCUMENTS

| | | | |
|---|---|---|---|
| H498 | 7/1988 | Keller et al. | 338/332 |
| 2,114,591 | 4/1938 | Clark | 338/313 |
| 2,830,698 | 4/1958 | Coda et al. | |
| 2,898,519 | 8/1959 | Foster | 361/723 |
| 2,898,520 | 8/1959 | Sterner | 361/723 |
| 3,167,541 | 1/1965 | Tierman | 338/313 |
| 3,569,797 | 3/1971 | Simmons | |
| 3,597,666 | 8/1971 | Taskovich | |
| 3,611,275 | 10/1971 | Leddy et al. | 338/332 |
| 3,702,954 | 11/1972 | Mosch et al. | |
| 3,727,064 | 4/1973 | Bottini | |
| 3,740,701 | 6/1973 | Harnden, Jr. | 338/220 |
| 3,821,615 | 6/1974 | Nordstrom et al. | |
| 4,158,745 | 6/1979 | Keller | |
| 4,549,433 | 10/1985 | Gneiss et al. | 338/25 |
| 4,689,719 | 8/1987 | Prussas et al. | 361/386 |
| 5,239,745 | 8/1993 | Hofsass | 338/332 |
| 5,307,929 | 5/1994 | Seidler | |
| 5,353,199 | 10/1994 | Ohashi | 361/809 |
| 5,462,359 | 10/1995 | Reichl et al. | 338/25 |
| 5,910,189 | 6/1999 | Suzuki et al. | 338/229 |

*Primary Examiner*—Karl Easthom
*Attorney, Agent, or Firm*—Mark L. Mollon; Roger L. May

[57] ABSTRACT

A temperature sensor assembly (10) including a pair of rigid lead frames (12, 14) having retention pockets (24, 26) thereon for retaining a sensor assembly (32). The sensor assembly (32) includes a surface mount device package (34) containing a thermistor (36). The lead frames (12, 14) are molded into a housing (15) after assembly of the sensor assembly (32) to the lead frames (12, 14).

6 Claims, 2 Drawing Sheets

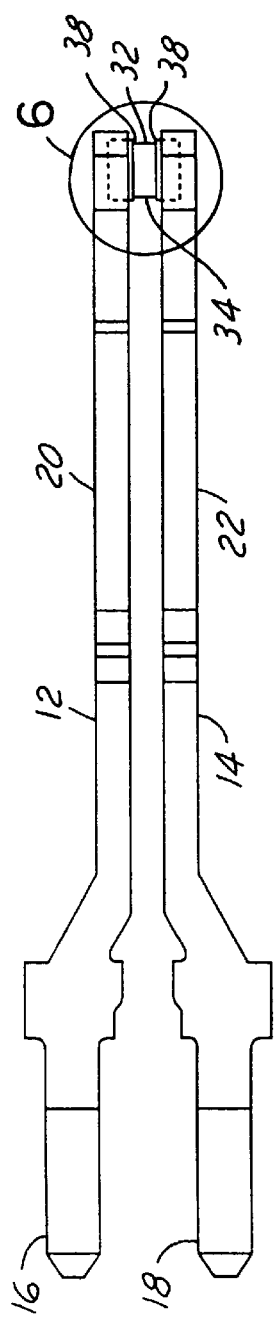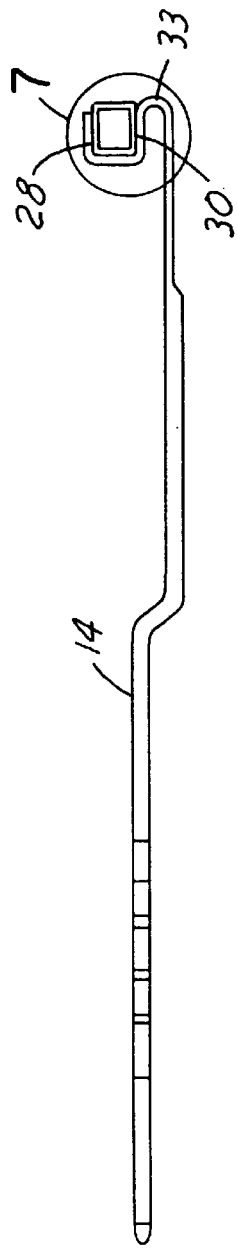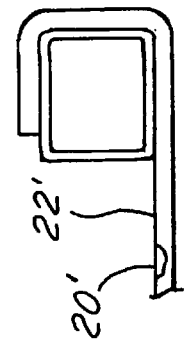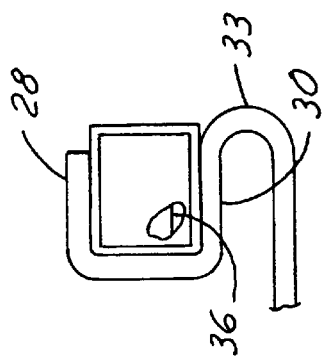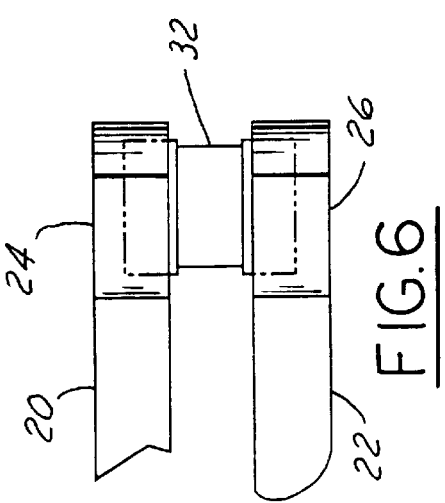

TEMPERATURE SENSOR ASSEMBLY

FIELD OF THE INVENTION

The present invention relates to temperature sensors, and more particularly relates to the assembly of temperature sensors onto lead frames to provide positive retention thereof.

BACKGROUND OF THE INVENTION

Temperature sensors are commonly used in several locations in a vehicle, in order to improve the operation of the vehicle. They may be located, for example, in an intake air stream, or in a coolant stream when contained in a brass bulb. These sensors need to be accurate and reliable while operating in the harsh vehicle environment over a long period of time. Further, since there may be several sensor assemblies per vehicle, the cost of the sensors must be minimized.

A temperature sensor used on a vehicle may, for example, include a pair of terminals, connected to a wiring harness, and also welded to a pair of wires. The wires are, in turn, soldered to a disc shaped thermistor. But this includes several electrical connections and is difficult to work with during assembly because of the wires, thus not lend itself well to automated assembly techniques. This, then, makes accurate location of the temperature sensor more difficult. To avoid the concerns created by the wires, one might employ a temperature sensor mounted on a substrate, which is then mounted to terminals. However, this would limit the temperature at which the assembly could operate because of the thermal expansion differences between the sensor element and the substrate material. In addition, concerns with defects in the substrate arise.

A desire exists, then, to maintain high reliability and accuracy over a wide temperature range in a harsh vehicle environment, while minimizing the cost of the sensor assembly. Further, it is desirable to have a sensor assembly arrangement that lends itself to automated assembly, to further minimize the cost.

SUMMARY OF THE INVENTION

In its embodiments, the present invention contemplates a sensor assembly including a surface mount device package including a first end having a first connector thereon and a second end having a second connector thereon, and a thermally sensitive device mounted within the package electrically connected between the first and the second connectors. A first lead frame includes a first terminal portion, a first pocket portion, and a first arm portion extending therebetween, with the first pocket portion shaped to form a U-shaped section having the first end mounted therein in electrical contact with the first connector. A second lead frame includes a second terminal portion, a second pocket portion, and a second arm portion extending therebetween, with the second pocket portion shaped to form a U-shaped section having the second end mounted therein in electrical contact with the second connector. The sensor assembly also includes means for retaining the device package in the first and the second pockets.

Accordingly, an object of the present invention is to provide a temperature assembly employing a surface mount device, without mounting directly on a substrate, by mounting the sensor on lead frames that positively locate the sensor assembly.

An advantage of the present invention is that intermediate electrical connections are minimized, improving reliability, while allowing for a low cost assembly.

Another advantage of the present invention is that the temperature sensor lead frame assembly allows for positive locating of the sensor allowing for accurate temperature reading.

A further advantage of the present invention is that the sensor lead frame assembly lends itself to automated assembly techniques because of the rigid lead frames and retention pockets with positive mechanical contact with the package.

An additional advantage of the present invention is that the temperature sensor lead frame assembly allows for a wide temperature range by eliminating the need for a substrate with the surface mount device package, thus avoiding the thermal expansion differences between the metal of the package and the substrate material.

BRIEF DESCRIPTION OF THE DRAWINGS

FIG. 4 is a plan view, on an enlarged scale, of the temperature sensor and lead frames of FIG. 1;

FIG. 5 is a side view of the temperature sensor and lead frames of FIG. 4;

FIG. 6 is an enlarged view of encircled area 6 in FIG. 4;

FIG. 7 is an enlarged view of encircled area 7 in FIG. 5; and

FIG. 8 is a view similar to FIG. 7, illustrating an alternate embodiment of the present invention.

DETAILED DESCRIPTION OF THE PREFERRED EMBODIMENTS

Figure 3:
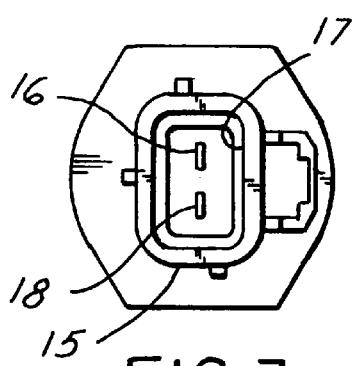
FIG. 3 is an end view of the assembly of FIG. 1.
Figure 1:
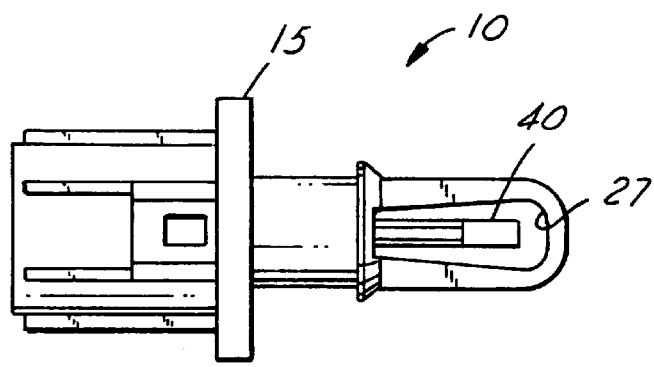
FIG. 1 is a plan view of a temperature sensor assembly in accordance with the present invention.
Figure 2:
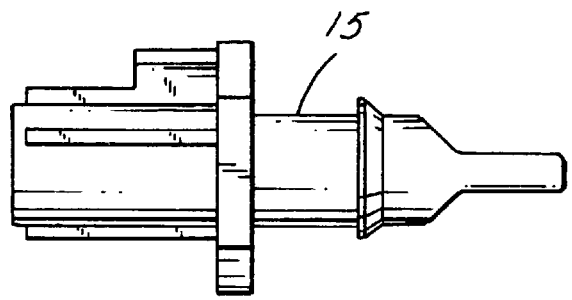
FIG. 2 is a side view of the assembly of FIG. 1.

FIGS. 1–7 illustrate an embodiment of the present invention. A sensor assembly 10 includes a first lead frame 12 and a second lead frame 14 molded into a sensor housing 15. Each lead frame 12 and 14 includes an electrical terminal 16 and 18, respectively, for forming an electrical connector to a wire harness or other electronic circuitry (not shown) and transmitting the temperature based signal to an engine control module (also not shown). A pocket 17 of the housing 15, within which the connectors 16 and 18 extend, will mount and positively locate the overall assembly 10 within the vehicle.

Each lead frame 12 and 14 also includes a rigid arm portion 20 and 22, respectively, for supporting and locating retention pockets 24 and 26, respectively. The housing 15 forms a U-shape, having the opening 27 therein. The arm portions 20 and 22 extend through the housing 15 and into a sensor opening 27. Each of the retention pockets 24 and 26 are shaped in a U-shape in order to provide positive retention support on three sides of a sensor assembly 32. The U-shaped pockets open in a direction opposite to that of the U-shaped portion of the housing 15 which forms the opening 27. Two portions 28 and 30 of each of the retention pockets 24 and 26 are spaced from one another a shorter distance than the width of the sensor assembly 32 so that an interference fit is created. Also, each arm portion 20 and 22 includes a second U-shaped portion 33 adjacent the retention pockets 24 and 26. These second U-shaped portions 33 allow for ease of automated assembly of the sensor assembly 32 into the pockets 24 and 26.

The sensor assembly 32 includes a surface mount device package 34 with an electrical connector 38 formed on each end. Each connector 38 creates the electrical contact between the package 34 and a respective one of the lead frames 12 and 14. The connectors 38 are preferably made of nickel or some other high temperature conductive material. This assembly is pressed into the retention pockets 24, 26 with the interference fit, with the ends of the pockets 24, 26 acting to create a spring loading, to ensure the positive mechanical retention for the sensor package 34 as well as the positive electrical contact. The connectors 38 are then soldered to the pockets 24 and 26 to further assure the long term integrity of the assembly. The metal-to-metal contact, then, eliminates the thermal expansion differences associated with substrate mounting, allowing for a wider temperature range of use. The assembly is preferably done using machines, and is accomplished before the housing 15 is molded over the lead frames 12 and 14.

Sealed within the sensor package 34 itself is a thermistor 36. This thermistor is a conventional device known to those skilled in the art and so will not be discussed further herein. Leads from the thermistor 36, of course, are in electrical contact with the connectors 38 in order to create the electrical contacts needed for the device to operate. By incorporating the thermistor 36 is this way, a solder interface with the thermistor directly is avoided, thus avoiding a complicated and costly interface. To finish the assembly of the sensor assembly 32, a sealing material 40 is applied around the sensor assembly 32 and retention pockets 24 and 26. This is all done prior to molding the housing 15 around the assembled lead frame/sensor assembly.

FIG. 8 illustrates an alternate embodiment of the present invention wherein the arms 20' and 22' are altered. For this embodiment, elements modified from the first embodiment will be referred to with the same element numbers, but with an added prime. The second U-shaped portion is not included in the arms 20' and 22' in order to simplify fabrication of the lead frames 12 and 14 themselves. However, this will make the automated assembly of the sensor assembly 32 into the retention pockets 24 and 26 somewhat more difficult.

While certain embodiments of the present invention have been described in detail, those familiar with the art to which this invention relates will recognize various alternative designs and embodiments for practicing the invention as defined by the following claims.

We claim:

1. A sensor assembly comprising:

a thermistor;

a first lead frame including a first terminal portion, a first pocket portion, and a first rigid arm portion extending in a longitudinal direction therebetween, with the first pocket portion shaped to form a U-shaped section having flexible sides relative to the first rigid arm portion for generating a spring load therebetween and having the thermistor mounted therein in electrical contact therewith;

a second lead frame including a second terminal portion, a second pocket portion, and a second rigid arm portion extending in a longitudinal direction therebetween, with the second pocket portion shaped to form a U-shaped section having flexible sides relative to the second rigid arm portion for generating a spring load therebetween and having the thermistor mounted therein in electrical contact therewith;

a sensor housing formed in a U-shape having an opening therein and molded around a portion of the first and the second lead frames said U-shape and said U-shaped sections opening in opposite directions to each other;

means for retaining the thermistor in the first and the second pockets; and said U-shaped sections opening in a direction parallel to said longitudinal direction of the respective first and second arm portions and away from the respective terminal portions, said thermistor, said U-shaped sections and a part of said rigid arm portions located in the opening.

2. The sensor assembly of claim 1 wherein the first and the second arm portions each include a second U-shaped section adjacent the respective first and second pockets.

3. The sensor assembly of claim 1 wherein the first and the second connectors are made from nickel.

4. The sensor assembly of claim 1 wherein the means for retaining includes a first solder location formed the first lead frame and a second solder location formed on the second lead frame.

5. The sensor assembly of claim 1 wherein the means for retaining includes an interference fit between the first and second pockets and opposing ends of the thermistor, respectively.

6. The sensor assembly of claim 1 further including a sealing material enclosing the device package and a portion of the first and second lead frames.

\* \* \* \* \*